United States Patent
Shin et al.

(10) Patent No.: US 10,695,745 B2
(45) Date of Patent: Jun. 30, 2020

(54) SOLID, HYDROPHOBIC AGGREGATORS AND METHODS OF MAKING AND USING THE SAME

(71) Applicant: Battelle Memorial Institute, Richland, WA (US)

(72) Inventors: Yongsoon Shin, Richland, WA (US); George T. Bonheyo, Sequim, WA (US); Eric M. Winder, Sequim, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 95 days.

(21) Appl. No.: 15/948,888

(22) Filed: Apr. 9, 2018

(65) Prior Publication Data

US 2019/0308166 A1 Oct. 10, 2019

(51) Int. Cl.
| | | |
|---|---|---|
| *B01J 20/24* | (2006.01) | |
| *C08B 3/16* | (2006.01) | |
| *B01J 20/28* | (2006.01) | |
| *B01J 20/32* | (2006.01) | |
| *A62D 3/02* | (2007.01) | |
| *C02F 1/28* | (2006.01) | |
| *C02F 3/34* | (2006.01) | |

(Continued)

(52) U.S. Cl.
CPC ............. *B01J 20/24* (2013.01); *A62D 3/02* (2013.01); *B01J 20/2803* (2013.01); *B01J 20/3206* (2013.01); *B01J 20/3217* (2013.01); *B01J 20/3246* (2013.01); *C02F 1/286* (2013.01); *C02F 3/348* (2013.01); *C08B 3/16* (2013.01); *C09K 3/32* (2013.01); *E02B 15/041* (2013.01); *E02B 15/042* (2013.01); *A62D 2101/20* (2013.01); *C02F 2101/32* (2013.01); *C02F 2103/007* (2013.01)

(58) Field of Classification Search
None
See application file for complete search history.

(56) References Cited

U.S. PATENT DOCUMENTS

| | | | | |
|---|---|---|---|---|
| 3,392,085 A | * | 7/1968 | Oliver ............... | D21H 17/14 162/175 |
| 4,537,877 A | * | 8/1985 | Ericsson ............ | C02F 1/681 210/693 |

(Continued)

FOREIGN PATENT DOCUMENTS

| | | | | |
|---|---|---|---|---|
| DE | 1922038 A1 | * | 11/1970 | ............. D21H 17/14 |
| DE | 2029655 A1 | * | 12/1971 | ............. D21H 17/14 |

OTHER PUBLICATIONS

Baggott, J., https://library.med.utah.edu/NetBiochenn/FattyAcids/3_1.html,(1997) downloaded Sep. 6, 2019. (Year: 1997).*

(Continued)

*Primary Examiner* — Chester T Barry
(74) *Attorney, Agent, or Firm* — Derek H. Maughan (57) ABSTRACT

Disclosed herein are aggregators that can be cellulosic particles having high oil sorption capacity, high hydrophobicity, high buoyancy in water, and an aggregation quality that can support environmental remediation of hydrocarbon spills (e.g., crude oil spills) by various cleanup strategies including burning, skimming, or bioremediation. Also disclosed are methods of making the materials and methods of using the materials for environmental remediation.

22 Claims, 9 Drawing Sheets

(51) Int. Cl.
*E02B 15/04* (2006.01)
*C09K 3/32* (2006.01)
*C02F 103/00* (2006.01)
*C02F 101/32* (2006.01)
*A62D 101/20* (2007.01)

(56) References Cited

U.S. PATENT DOCUMENTS

| | | | | |
|---|---|---|---|---|
| 4,670,156 | A * | 6/1987 | Grenthe | B01J 20/24 134/7 |
| 5,244,574 | A * | 9/1993 | Gatt | C02F 1/681 210/610 |
| 5,342,525 | A * | 8/1994 | Rowsell | B09C 1/00 210/611 |
| 5,492,881 | A * | 2/1996 | Diamond | B01J 20/30 502/401 |
| 10,240,311 | B2 * | 3/2019 | Takamura | E02B 15/041 |
| 2017/0350084 | A1 * | 12/2017 | Seyfarth | E02B 15/042 |
| 2018/0185802 | A1 * | 7/2018 | Nedwed | B01F 17/0085 |

OTHER PUBLICATIONS http://www.ochempal.org/index.php/alphabetical/a-b/alkyl-group/ downloaded Sep. 6, 2019 (Year: 2019).*
Uschanov et al., Heterogeneous modification of various celluloses with fatty acids, Cellulose (2011) 18:393-404 (Year: 2011).*
Freire, C. S. R., et al., Controlled Heterogeneous Modification of Cellulose Fibers with Fatty Acids: Effect of Reaction Conditions on the Extent of Esterification and Fiber Properties, Journal of Applied Polymer Science, vol. 100, 2006, 1093-1102.
NRT-RRT Factsheet, Application of Sorbents and Solidifiers for Oil Spills, Prepared by the National Response Team Science & Technology Committee, Feb. 2007, 1-6.

* cited by examiner

SOLID, HYDROPHOBIC AGGREGATORS AND METHODS OF MAKING AND USING THE SAME

ACKNOWLEDGEMENT OF GOVERNMENT SUPPORT

This invention was made with Government support under Contract DE-AC0576RL01830 awarded by the U.S. Department of Energy. The Government has certain rights in the invention.

FIELD

The present disclosure relates generally to environmental remediation and more particularly to solid, hydrophobic aggregators, methods of using the same, and methods of making the same.

BACKGROUND

Hydrocarbons like crude oil are some of the most important energy sources worldwide. However, when these vital resources are spilled or are out of control, it causes significant environmental and ecological problems. For example, when crude oil is spilled in an aqueous environment, effective decontamination and cleanup are necessary for the protection of environment and human health. One important technology for mitigating crude oil spills is to apply a chemical herding agent that corrals the oil by reacting with water to reduce the air-water surface tension, which causes oil to retract or "push inward" from the periphery of the spill due to a negative spreading coefficient. This may be used to prevent a spill from spreading into a sensitive area, or to corral the oil into a thicker slick covering a smaller surface area. One such herding agent is the US Navy's (USN) cold water herder formulation (65% sorbitan monolaurate [Span-20] and 35% 2-ethyl butanol). Herding agents typically work most effectively when they are applied to undisturbed thin layers of oil slicks (<3 mm) for several hours. The objective is to create an oil slick thickness greater than approximately 3 mm, a thickness that allows the oil to be ignited and burned off. However, chemical herding agents suffer from several limitations. For example, they work best under calm sea conditions with low wind velocity and an absence of ice. Each application of a herding agent has a limited effectiveness of about an hour upon deployment. Furthermore, the herding agents themselves may be toxic.

Alternatives to herding agents can include sorbents. A sorbent acts by attracting and holding oil onto its surface; sorbents typically have highly interconnected pore spaces to increase the available surface area to increase the amount of oil that can be captured. An ideal sorbent rejects water (is hydrophobic) and is buoyant. After collecting oil, sorbents must then be retrieved and treated to recover, treat, or dispose of the oil. To facilitate retrieval, sorbents are formatted into sheets (for small spills typically in a confined area) or booms (for small to large spills, including open water spills). Mineral and synthetic sorbents can have high oil sorption capacity. However, they can be slow to degrade and/or can leave undesirable combustion products and are therefore not used with in situ burning. Vegetable-based sorbents are relatively friendlier to the environment, but do not perform as well, especially in the presence of waves and wind. They tend to have relatively low oil sorption capacity, low hydrophobicity and poor buoyancy compared to synthetic and mineral sorbents.

Accordingly, a need exists for oil adsorption materials that are environmentally friendly, have high oil sorption capacity, are highly buoyant, and can create oil slicks of sufficient thickness and stability (i.e., limited spreading, fragmenting, or sinking) to be burned in situ, even under windy, wavy, or icy conditions. A need also exists for methods of making the materials, and methods of using the material for environmental remediation.

SUMMARY

Disclosed herein are aggregators for remediation in aqueous environments, methods of using the same, and methods of making the same. As used herein, aggregator refers to a particulate material that combines the oil capture and holding properties of a sorbent with the oil coalescing properties of a herding agent. However, aggregators differ from both sorbents and herding agents as detailed elsewhere herein.

In some embodiments, a method of environmental remediation comprises dispersing a quantity of aggregators at a surface region of an aqueous environment in which a liquid hydrocarbon has been spilled, wherein the solid aggregators comprises water-buoyant, cellulosic particles having a hydrophobic surface modified by oleic acid and further modified by one or more additional fatty acids. The hydrophobic surface can comprise C18 alkyl chains and at least one other type of alkyl chain having a chain length different than C18. The method further comprises adsorbing the liquid hydrocarbon to the solid aggregators and aggregating a floating mass of aggregator and oil at the surface of the aqueous environment. The mass can comprise the solid aggregator having the liquid hydrocarbon adsorbed thereto. In certain embodiments the mass can resemble a slurry comprising particles of the aggregator and the liquid hydrocarbon. A non-limiting example of a liquid hydrocarbon is crude oil. Examples of aqueous environments can include, but are not limited to bodies of water such as oceans, seas, lakes, ponds, wetlands, rivers, streams, canals, reservoirs, and puddles. Additional examples can include, but are not limited to waste water collection systems such as storage tanks and basins. The aggregators are also effective in environments having snow and/or ice.

In certain embodiments, the quantity of aggregator dispersed to the aqueous environment can be expressed as a ratio ranging from 1:8 to 1:50 (aggregator:liquid hydrocarbon by mass). In certain embodiments, the method can further comprise collecting the mass of aggregator and oil from the surface of the aqueous environment. In certain embodiments, the method can further comprise in-situ burning the mass at the surface of the aqueous environment. In certain embodiments; the method can further comprise remediating in situ the liquid hydrocarbon adsorbed to the solid aggregator, wherein the hydrophobic surface of the solid aggregator further comprises a bioremediation microorganism. In certain embodiments, the solid aggregator has a crystallinity index value less than or equal to 3%. In certain embodiments, the solid aggregator has a crystallinity index value of approximately 0%. In certain embodiments, the fatty acid has an alkyl chain length less than C22. In certain embodiments, the fatty acid has an alkyl chain length between C10 and C14, inclusive. In certain embodiments, said adsorbing further comprises not chemically reacting with water in the aqueous environment. In certain embodiments, the solid aggregator has an oil sorption capacity of at least 5 g of hydrocarbon per gram of aggregator.

In some embodiments, a method of synthesizing aggregators can comprise modifying a native surface of a cellulosic particle with oleic acid to yield a first modified surface comprising C18 alkyl chains and modifying the first modified surface with a fatty acid having a second alkyl chain length different than C18 to yield a hydrophobic second modified surface comprising C18 alkyl chains and alkyl chains having the second alkyl chain length.

In certain embodiments, the cellulosic particle comprises a wood particle. In certain embodiments, the wood particle comprises a soft wood particle. A non-limiting example of a soft wood includes gymnosperm trees including conifers. In certain embodiments, the second alkyl chain length is less than or equal to C22. In certain embodiments, the second alkyl chain length is between C10 and C14, inclusive. In certain embodiments, said modifying step comprises adding the cellulosic particle to a solution comprising pyridine with oleic acid, the fatty acid, or both dissolved therein. In certain embodiments, the solution further comprises p-toluenesulfonyl dissolved therein. In certain embodiments, the method can further comprise modifying the second modified surface with a fatty acid having a third alkyl chain length different than C18 and the second alkyl chain length to yield a hydrophobic, third modified surface comprising C18 alkyl chains and alkyl chains having the second and third alkyl chain lengths. In certain embodiments, the method can further comprise depositing a bioremediation microorganism on the hydrophobic second modified surface. In certain embodiments, the method can further comprise incorporating the cellulosic particle having the hydrophobic second modified surface into a composite construction material comprising a polymer.

In some embodiments, a hydrocarbon-remediation aggregator comprises a water-buoyant, wood particle having a hydrophobic surface that comprises C18 alkyl chains and at least one other type of alkyl chain having a chain length different than C18, and wherein the aggregator has a crystallinity index less than or equal to 3% and a hydrocarbon sorption capacity of at least 5 g of hydrocarbon per gram of aggregator. In certain embodiments, the aggregator has a water contact angle greater than 120°. As used herein, cellulosic can mean materials comprising cellulose from just above 0% to 100%. In certain embodiments, the cellulosic material comprises lignocellulose. In certain embodiments, the aggregator is non-toxic.

In certain embodiments, the hydrophobic surface further comprises a bioremediation microorganism attached thereto. The microorganisms can be stabilized on the surface of the aggregator particles for long durations and activated by water or other means at the time of dispersal and/or remediation. For example, bioremediation microorganisms on the aggregator particle surfaces can be stable for at least 2 weeks. Traditional microorganisms have a viability on the order of days. By the time they are delivered to a site (1-2 days), many have died. Furthermore, since the microorganisms exist on the surfaces of the aggregator particles, their activity is maximized at the surface where oil is concentrated and the greatest amount of oxygen is available (from the atmosphere) to support oil metabolism. Further still, the aggregator provides surface area to help organisms biodegrade the oil.

While the aggregator is highly effective in bodies of water, its application is not limited thereto. For example, the aggregator can be dispersed on the ground, which can be wet, snowy, or icy. The aggregator can also be incorporated into composite materials including sawdust to form building and construction materials.

The purpose of the foregoing summary and the latter abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. Neither the summary nor the abstract is intended to define the invention of the application, which is measured by the claims, nor is it intended to be limiting as to the scope of the claims in any way.

DETAILED DESCRIPTION

Disclosed herein are materials comprising cellulosic particles having high oil sorption capacity, hydrophobicity, high buoyancy in water, and an oil sorption, retention, and coalescing quality that can support environmental remediation of hydrocarbon spills (e.g., crude oil spills) by various cleanup strategies including burning, skimming, or bioremediation. In some embodiments, the materials can perform at least the functions of both sorption and herding and are herein referred to as aggregators. Also disclosed are methods of making the aggregators and methods of using the aggregators for environmental remediation. The inventors have determined that effective materials for a crude oil spill cleanup should exhibit important characteristics such as: oleophilicity, hydrophobicity, oil sorption and retention capacity, ice-phobicity, buoyancy, and biodegradability. Hydrophobicity with oleophilicity are advantageous sorbent properties that influence the effectiveness of oil sorption in the presence of water.

The effectiveness oil sorption by aggregators in aqueous environments are enhanced when the surface density of the hydroxyl functionalities is decreased. The problems of low oil sorption capacity, low hydrophobicity and poor buoyancy in cellulosic particles are solved by replacing the surface hydroxyl groups with at least two kinds of fatty acids to yield the aggregator. In some embodiments, the crystallinity index of the aggregator is less than or equal to 3%. In certain embodiments, the crystallinity index of the aggregator is equal to approximately 0%, or is statistically not distinguishable over the noise level of a measurement.

In some embodiments, the aggregators comprise a cellulosic particle having a hydrophobic surface modified by oleic acid and further modified by one or more additional fatty acids. The resultant hydrophobic surface comprises C18 alkyl chains and at least one other type of alkyl chain having a chain length different than C18. Since crude oil is a mixture of hydrocarbons having different lengths, branches, ring structures, and chains, using a mixture of fatty acids facilitates a broader range of attractive forces than just using one fatty acid. Furthermore, the mixture of fatty acids applied according to methods described herein results in the minimization or elimination of surface hydroxyl groups. In certain embodiments, the modifications described herein do not involve anaerobic baking, or acetylation. In certain embodiments, modifications described herein do not yield an aggregator comprising a slurry of hydrocarbons and cellulosic particles.

Unlike herding agents, solid aggregators described herein are not liquid reactants and do not alter the chemistry of the water. Rather, embodiments described herein are solid particulate adsorbents having a high affinity for oil and not water. Aggregator particles in an aqueous environment tend to adsorb hydrocarbons and aggregate together because of their hydrophobicity and extreme buoyancy, which are unlike properties of liquid herding agents and traditional adsorbents. Aggregators placed in aqueous environments contaminated with liquid hydrocarbon (e.g., an oil spill) can adsorb the hydrocarbon and aggregate into a mass. The mass can comprise the aggregators and the hydrocarbon. In some instances the mass can resemble a thick slurry. Unexpectedly, tar and ash resulting from burning the aggregator material on the surface of water will float. During a burn, the aggregator provides a means for vaporization of adsorbed hydrocarbons, and the vapor burns, leaving a portion of the aggregator unconsumed. The unconsumed aggregator prevents the combustion products from sinking, which facilitates collection or decomposition at the surface of the water. In contrast, combustion of oil slicks and/or herding agents results in environmentally unfriendly tar balls that sink within hours or a few days.

Figure 1:
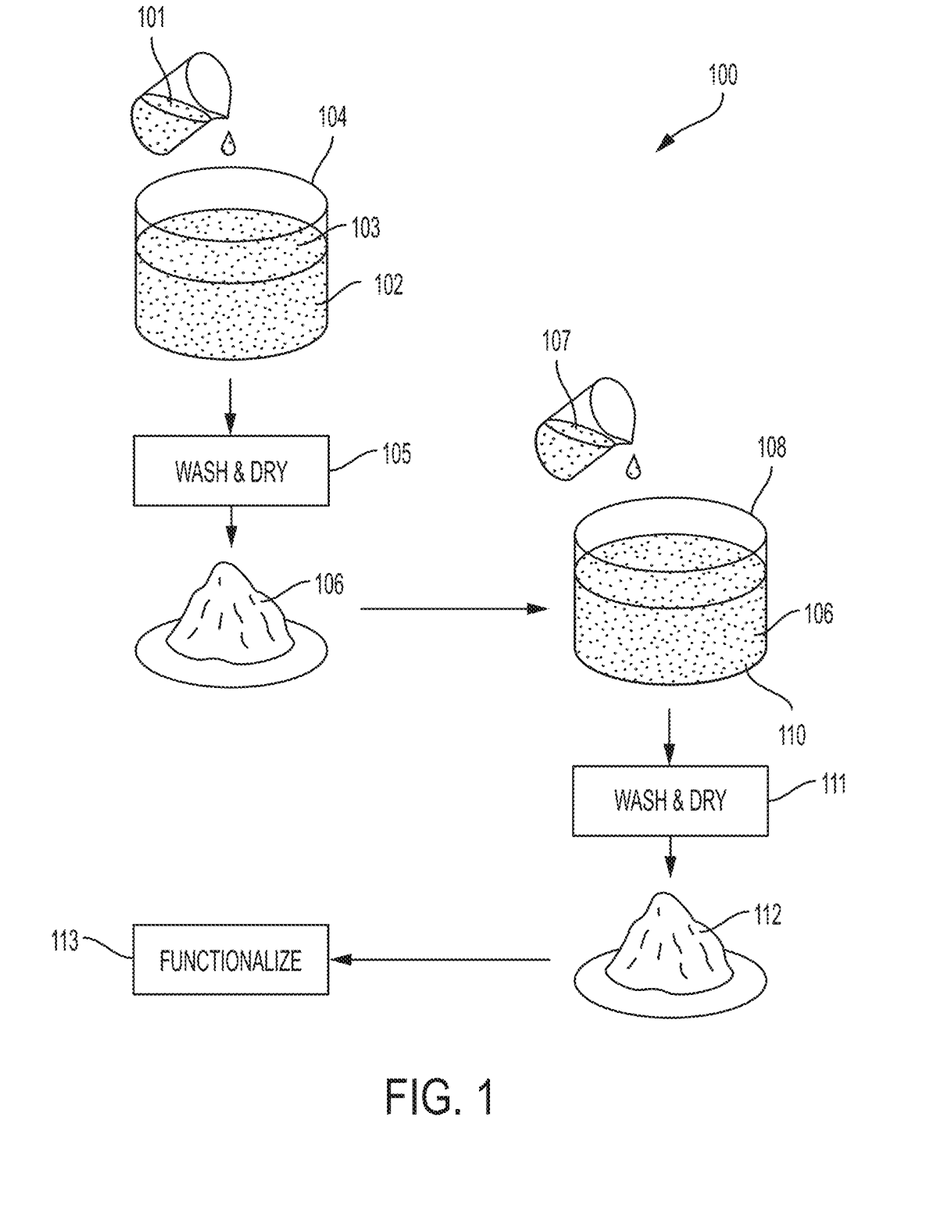
FIG. 1 is an illustration of one embodiment of a process for synthesizing solid, highly hydrophobic aggregators.

Referring to FIG. 1, an example of a process 100 for synthesizing solid aggregators is illustrated. Prior to addition of oleic acid (OA) solution 101, cellulosic particles 102 are mixed with a solvent 103 to yield a first mixture 104. The cellulosic particles 102 can include soft woods, hard woods, or a mixture of both. The cellulosic particles 102 are not limited to wood, but can include other plant matter such as cellulose, etc. Organic matter that exhibits good exfoliation of cellulose crystals can facilitate hydroxyl group elimination and or penetration of OA. Cellulosic material can mean materials comprising cellulose from just above 0% to 100%. In certain embodiments, the cellulosic material comprises lignocellulose. Examples can include, but are not limited to cotton, softwoods, hardwoods, rice husks, and wheat straw. The size of the particles can range from 200 μm to 1000 μm in average diameter. Relatively smaller particles can be exfoliated more easily in in the solvent.

Suitable solvents 103 include a chemical leaving group. The solvent can further comprise additives including, but not limited to p-toluenesulfonyl chloride (p-TsCl), sulfate, and halides. The additives can function to form bonds with surface hydroxyl groups, and easily leave when OA reacts and forms ester bonding on the surface. The OA solution 101 can comprise OA dissolved in a solvent, pyridine. Additional solvents can include dimethyl formamide and piperidine.

Heating the first mixture 104 can facilitate the reaction of OA solution 101 with the cellulosic particles 102. The temperature of the mixture 104 can range from 40 to 80° C. After the first reaction, the OA-modified cellulosic particles are washed and dried 105. The wash can involve rinsing with ethanol. Drying can occur at various temperatures and can be performed under vacuum or in a controlled ambient atmosphere. For example, a cover gas can facilitate drying.

The resultant OA-modified cellulosic 106 can then be added to a second mixture 108 comprising a second solvent 110. The second solvent 110 can comprise one or more additives, including, but not limited to, p-TsCl, sulfate, and halides. The additives can function to form bonds with surface hydroxyl groups, and easily leave when OA reacts and forms ester bonding on the surface. Additional fatty acids 107 are added to the second mixture 108. Similar to the first mixture 104, the second mixture 108 can be heated to similar temperatures to facilitate reaction of the OA-modified cellulosic particles 106 with the additional fatty acids 107.

The fatty acid solution 107 can comprise one or more additional fatty acids dissolved in a solvent, such as pyridine. The fatty acids can comprise one or more of the fatty acids having an alkyl chain length of with C3, C6, C8, C10, C12, C14, C16, and C18. Additional solvents can include dimethyl formamide and piperidine.

After reacting the second mixture 108 and the additional fatty acid solution 107, the further-modified particles can be washed and dried 111 to yield aggregator particles.

As illustrated, the aggregator particles 112 can be further functionalized 113 by mixing with microbiological organisms to assist with bioremediation. Examples of organisms can include fungi and bacteria known to metabolize hydrocarbons. Examples include, but are not limited to, *Hormoconis resinae*, *Aspergillus* spp., *Alcanivorax borkumensis*, *Pseudomonas putida*, *Acinetobacter* spp., *Gordonia amicalis*, and *Rhodococcus* spp. Functionalization can include the addition of liquid suspensions of one or more species of oil metabolizing bacteria or fungi. The suspensions may come from cultures of the microorganisms grown on liquid growth media, or may entail cells prepared on liquid or solid media and then transferred to into a buffered salt solution. The growth medium may or may not include petroleum hydrocarbons to stimulate the expression of genes associated with oil metabolism. Other functionalization may include the addition of nutrients (e.g., nitrogen and iron sources) to promote the growth of naturally occurring microorganisms or microorganisms that were added to the aggregator. In another embodiment, other functionalization may include enhancements intended to enable easier ignition or higher burn temperatures, such as accelerants including powdered magnesium.

The following explanations of terms and abbreviations are provided to better describe the present disclosure and to guide those of ordinary skill in the art in the practice of the present disclosure. As used herein, "comprising" means "including" and the singular forms "a" or "an" or "the"

include plural references unless the context clearly dictates otherwise. The term "or" refers to a single element of stated alternative elements or a combination of two or more elements unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximations unless the word "about" is recited.

Examples and Comparisons

To further illustrate certain embodiments of the disclosed hydrocarbon-remediation aggregators, methods of making the same, and methods of environmental remediation using the same, and to provide various comparative analyses and data, below are some examples with comparison test data. The examples are related to a finely milled wood flour modified by oleic acid (OA) and further modified with one or more additional fatty acids. Extra hydroxyl groups on an oleic-acid-modified pine sawdust are modified with the additional fatty acids, which have a different alkyl chain length than the oleic acid. The result is a hydrophobic, extremely buoyant, oleophilic aggregator that can be applied to environmental remediation and/or building materials as described elsewhere herein.

Pine sawdust material used in the examples below was 40-60 mesh and had an average diameter of approximately 250-400 μm. Before the reaction, all sawdust samples were vacuum dried at 60° C. for 2-3 days to prevent the contamination of pyridine with water and the aggregation of the leaving group (p-toluenesulfonyl group) on sawdust samples.

Prior to an esterification reaction of the sawdust with oleic acid, 3.48 g of p-toluenesulfonyl chloride (p-TsCl) was dissolved in 30 mL pyridine then 1.0 g of sawdust was added. The reaction mixture, contained within a reaction flask, was placed in a silicon oil bath (55-58° C.) and 5.0 g of oleic acid was slowly added to the mixture with vigorous stirring for 6, 8, or 10 h. Once reaction was completed, the newly synthesized aggregator was cooled, filtered, and ethanol-washed, followed by Soxhlet extraction with ethanol. The final product was vacuum dried at 60° C. overnight and ready for further modification with different fatty acids. The three base materials (pine/OA-106 and pine/OA-124) are further modified with C3, C6, C8, C10, C12, C14, C16, and C18 fatty acids using the same process (55° C. for 8 h).

Synthesized aggregators were weighed to determine the weight percent gains (WPG, [(weight gain/original weight)]×100). After storing dry samples in saturated aqueous $K_2CO_3$ solution (43.2±0.4 relative humidity (RH) at 20° C.) overnight, moisture sorption values were obtained. The method used to calculate moisture sorption percentage involved dividing the increased weight by the dry sample weight and multiplying by one hundred. X-ray diffraction (XRD) patterns of unmodified and modified aggregators were obtained by a desktop X-ray diffractometer using Cu Kα (1.54059 Å) radiation with the X-ray generator operating at 20 kV and 30 mA. Data were collected for a 2θ range of 5.0-40.0° at an angular resolution of 0.01°/s.

The crystallinity index ($I_c$) was determined using Eq. (1):

$$\text{Crystalinity Index } (I_c) = \frac{I_{(002)} - I_{(am)}}{I_{(002)}} \times 100 \quad (1)$$

where $I_{(002)}$ is the counter reading for the peak intensity at a 2θ angle close to 22° and $I_{(am)}$ is the amorphous counter reading at a 2θ angle at approximately 18°. Fourier Transform Infrared (FT-IR) spectra were recorded over a range from 400-4000 $cm^{-1}$ with a resolution of 2.0 $cm^{-1}$, FT-IR spectrometer. $^{13}C$ cross polarization and magic angle spinning (CP/MAS) nuclear magnetic resonance (NMR) for a series of aggregator samples were performed at 11.4 T using a 600 MHz solid state NMR spectrometer equipped with a 4 mm HFXY MAS probe. All $^{13}C$ CP/MAS NMR spectra were obtained using a vender supplied sequence (tancpx in VNMRJ, Agilent) with a 3-s recycle delay and 2-ms contact time at a 15 kHz spinning rate and at ambient temperature (~25° C.). The $^1H$ 90° pulse length was 5 μs. The $^{13}C$ chemical shift was externally calibrated with hexamethylbenzene (HMB) of 17.3 ppm relative to tetramethylsilane (TMS) of 0 ppm. The thermogravimetric analysis (TGA) was carried out by an analyzer equipped with an alumina cell. Samples were heated at a constant rate of 10° C./min from 25.0 up to 700° C., with in air flow of 50 mL/min and nitrogen (protecting gas) flow of 15 mL/min. The initial thermal decomposition temperature ($Td_i$) was recorded when sample heating resulted in weight loss (≤0.5%). Materials were prepared for contact angle measurements by first affixing Scotch double-sided tape to a microscope slide and then pouring the sample material in excess on the tape. Material was then brushed with a gloved finger to remove any non-bound material. This slide was then placed on the stage of an automated goniometer. The goniometer was operated using software to apply a 15 μL drop of 18 MΩ purified water to the sample surface. Images were obtained with backlighting (adjusted to reduce impact of sample surface roughness). Each sample contact angle was determined as an average of 6 distinct 15 μL drops, with each drop being measured 40 times (8 measurements; 5 frames averaged per measurement).

The sorption capacity of aggregator samples was tested with crude oil. Crude oil can be difficult for adsorbents that are merely OA-modified to adsorb because crude oil comprises molecules having a variety of alkyl chain lengths. Aggregator was weighed (~100 mg) and placed in the middle of a 50 mm petri dish. Using a micropipette, crude oil was gradually added to the aggregator until it was saturated then weighed. The amount of oil that was sorbed by the aggregator was assessed and sorbed oil (g)/aggregator (g) values were calculated. Sorption measurements of crude oil were carried out in triplicate for each type of aggregator to get average and standard deviation values.

Pine wood flour (40-60 mesh) shows good exfoliation of cellulose crystals to allow OA molecules to infiltrate and react on the surface. Larger pine wood particles (10-20 mesh) or hardwoods (e.g., maple) can be modified as well, however pine wood modification resulted in more desirable material properties. Two modified pine materials (pine/OA-106 and pine/OA-124) were used as base materials for mixed fatty acid modification, each base material was modified with different amounts of OA and were synthesized using different durations of reaction time at 55° C. We also prepared high OA-modified pine sample (>160%), but it showed lower surface coverage (<15%) after modification with a second fatty acid. Synthesis conditions and properties for the two OA-modified base materials are summarized in Table 1.

TABLE 1

Base materials modified with OA for mixed fatty acid-modified aggregators in this work.

| Base materials | Modification condition and WPG | | |
|---|---|---|---|
| | T (° C.) | Reaction time (h) | WPG (%) |
| pine/OA-106 | 55 | 6 | 106.21 |
| pine/OA-124 | 55 | 8 | 124.34 |

Figure 2A:
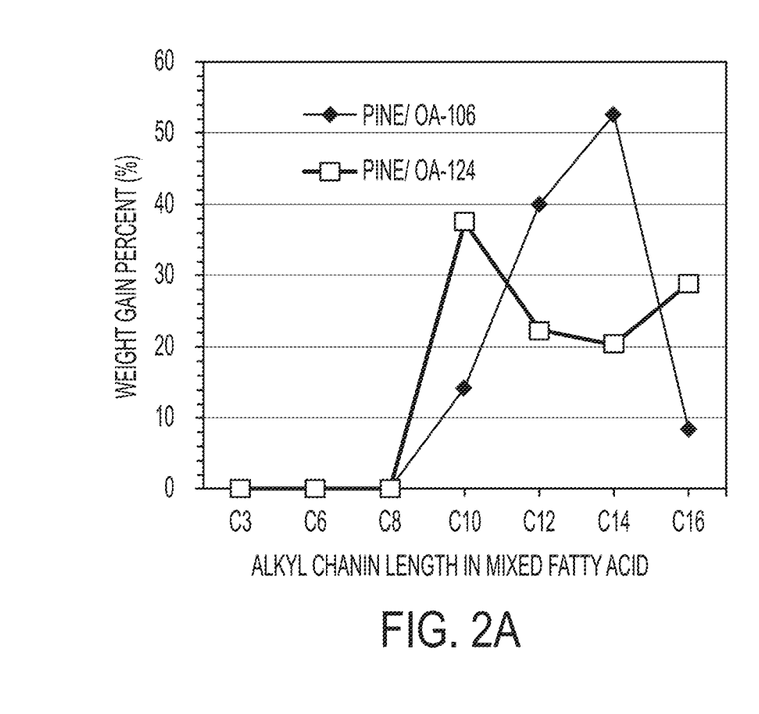
FIGS. 2A and 2B include graphs showing (2A) weight percent gain (WPG) measurements and (2B) moisture sorption results for two different OA-modified pine sawdust materials (i.e., pine/OA-106 and pine/OA-124).
Figure 2B:
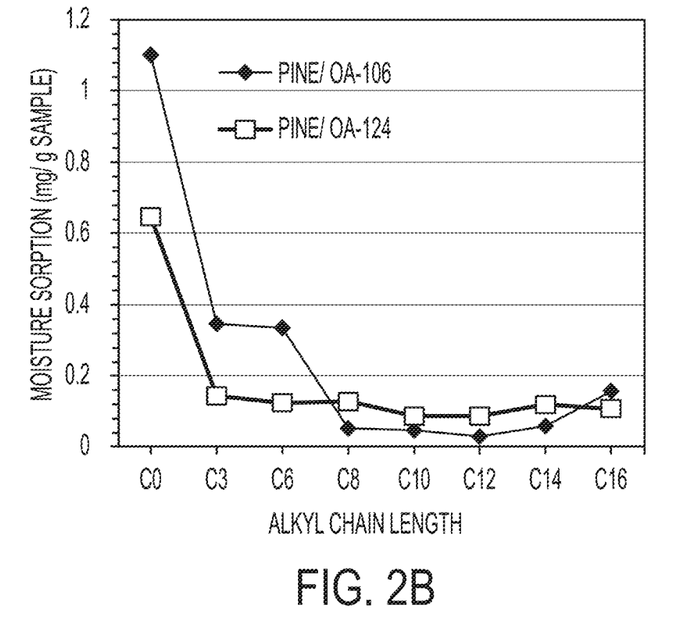

The base materials were further modified with one of C3, C6, C8, C10, C12, C14, C16, or C18 fatty acids at 55° C. for 8 h. FIG. 2A shows WPG of second fatty acids of pine/OA base materials. When fatty acids with relatively short alkyl chains (C3, C6, and C8) were applied, their WPG were very low (0-2.0 wt %). The less hydrophobic character of the shorter alkyl chains was not enough to penetrate into OA surface layers on sawdust. However, fatty acids with C10-C14 significantly contributed to WPG of both pine/OA-106 and pine/OA-124. Fatty acid with C16 did not show much enhancement of WPG of both base materials, where large alkyl chains might be too bulky to penetrate into OA layers. The hydrophobic character of mixed fatty acid-modified aggregators was confirmed by a moisture sorption test in $K_2CO_3$ at 20° C., where its relative humidity is 43.2±0.4% (FIG. 2B). Unmodified pine sawdust usually sorbs 3-3.5% moisture, and hydrophobic coverage of OA decreases moisture sorption to 0.65-1.10 wt %, depending on the surface coverage. The further modification of the base materials with the second fatty acids significantly decreased their moisture sorption down to ≤0.1 wt %. This result was confirmed by our contact angle measurement. The contact angle of the unmodified pine sawdust was 106.0°. However, the substantial enhancement of the hydrophobic character of the surface of the OA- and mixed fatty acid-modified aggregators was clearly proven by increase in e with the polar water: 133.07 (pine/OA-106), 133.780 (pine/OA-124), 134.69 (pine/OA-106-C10), 139.51 (pine/OA-106-C12), 136.98 (pine/OA-124-C10), and 135.06 (pine/OA-124-C12).

Figure 3A:
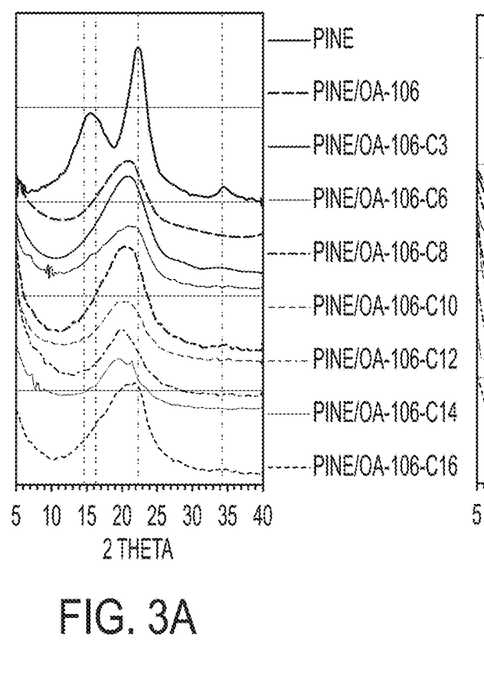
FIGS. 3A-3C are graphs showing X-ray diffraction (XRD) traces of materials including unmodified pine sawdust, OA-modified pine, and mixed fatty acid-modified aggregators: (3A) unmodified pine and pine/OA-106-based materials; (3B) unmodified pine and pine/OA-124-based materials; and (3C) change in d-spacing of (002) peak for various pine/OA-106-based and pine/OA-124-based mixed fatty-acid-modified aggregators.
Figure 3B:
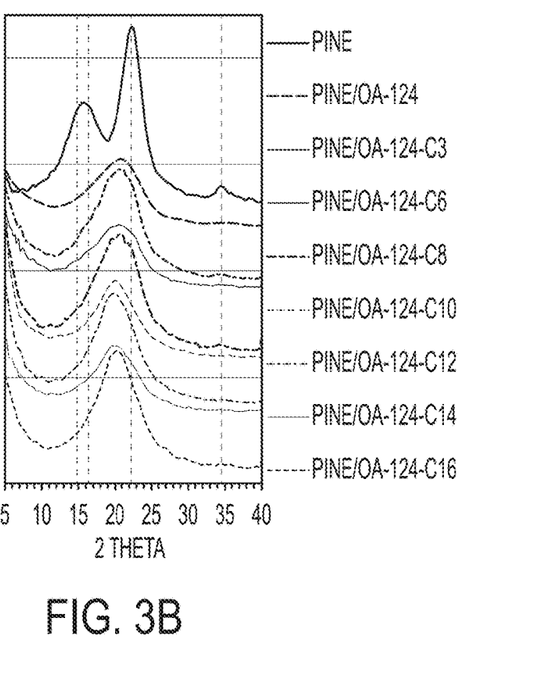
Figure 3C:
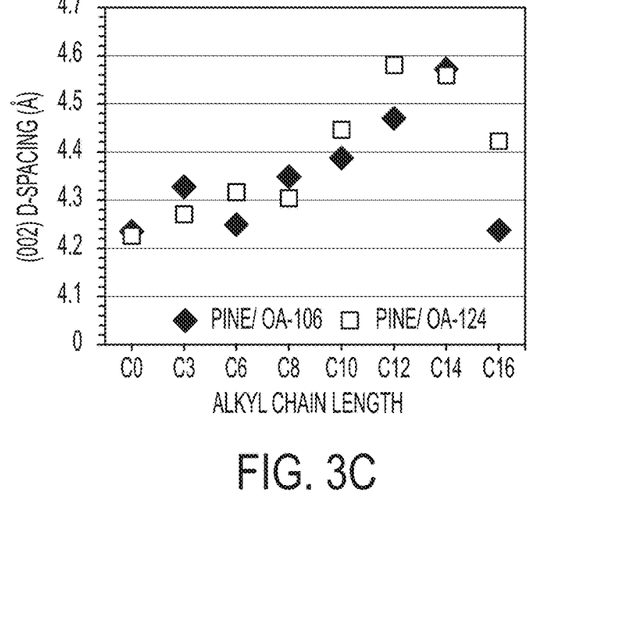

XRD patterns of unmodified, OA-modified, and mixed fatty acid-modified materials were collected and are shown in FIGS. 3A-3C. The main diffraction peaks of unmodified pine sawdust show a typical cellulose I crystalline structure at 2θ=15.0, 16.2, 22.3, and 35.0, which are assigned to the diffraction planes of 101, 10$\bar{1}$, 002, and 040, respectively. Peaks with significantly reduced intensity (or complete disappearance) in three diffraction planes, 101, 10$\bar{1}$, and 040, were observed in the pattern of the modified aggregators, which indicated that the structure of the cellulose was transformed to an amorphous structure after modification. (002) peak was maintained, but it showed a progressive broadening and exfoliation upon addition of the second fatty acid (FIG. 3C). A d-spacing of unmodified pine sawdust used in this study was 3.98 Å. It was significantly increased (4.23 Å) when modified with OA. When further modified with the second fatty acid, it increased up to 4.58 Å in pine/OA-124-C12, indicating that the substitution of hydroxyl groups by OA and second fatty acid breaks inter and intra-molecular hydrogen bonds of cellulose and decreases the degree of crystallinity. The crystallinity index determined in this study was 51.16% for the unmodified sawdust, 6.61% for OA-modified aggregators, and undetectable (0%) for the mixed fatty acid-modified aggregators. A major portion of cellulose is in a crystalline form due to intra- and intermolecular hydrogen bonding of hydroxyl groups. However, modification of the cellulose material often results in a decrease in crystallinity. The substitution of an alkyl group for a hydroxyl group reduces the density of hydrogen bonding because an alkyl group offers a more bulky and non-polar branch (i.e., a decreased ability to form hydrogen bonding) than a hydroxyl group. Therefore, the fatty acid-modified aggregators will possess more desirable properties for crude oil sorption in an aqueous environment.

Figure 4A:
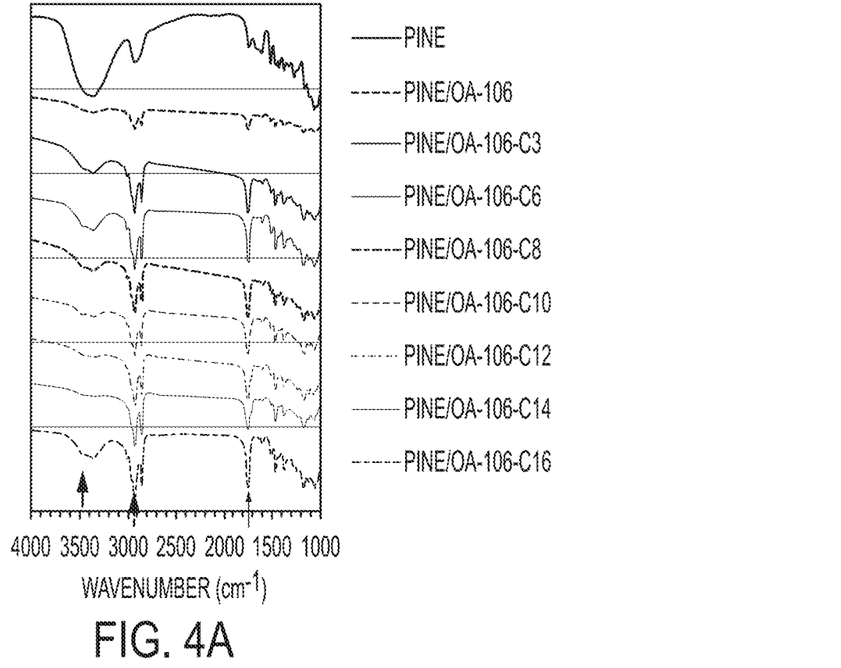
FIGS. 4A and 4B include FT-IR spectra of unmodified pine sawdust, OA-modified pine, and mixed fatty acid-modified aggregators: (4A) Pine/OA-106-based materials; and (4B) pine/OA-124-based materials.
Figure 4B:
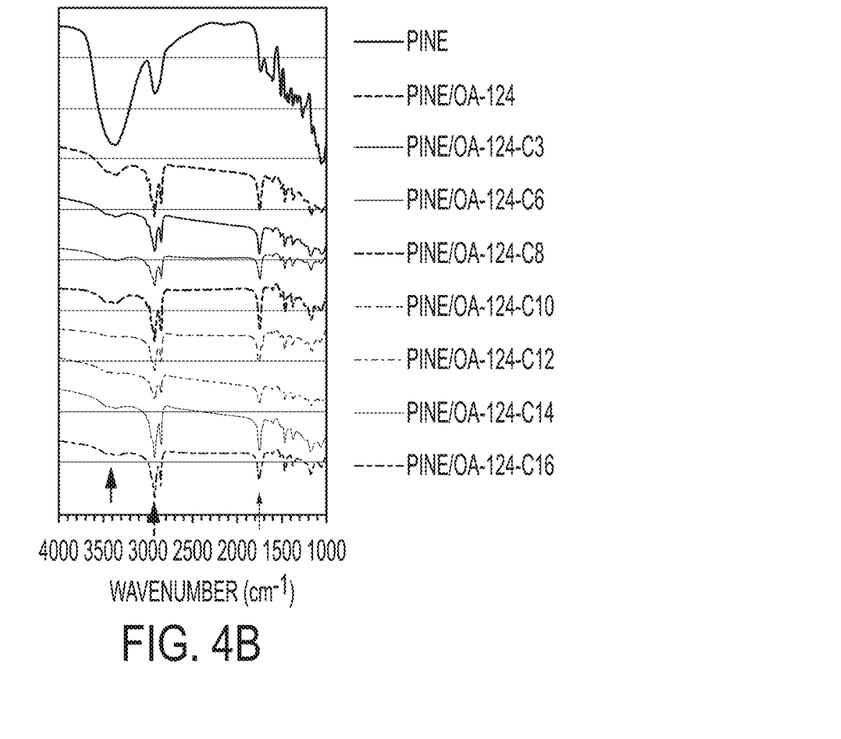

Fourier transform infrared (FT-IR) spectra of unmodified, OA-modified, and mixed fatty acid-modified materials give direct support of the occurrence of esterification by shifting and enhancement of carbonyl (C=O) peak at 1734 $cm^{-1}$ to higher wavenumber at 1747-1759 $cm^{-1}$ after the modification reaction and an increase in the intensity of the C—H band at 2850-2950 $cm^{-1}$ arising from the aliphatic acid chain (FIGS. 4A and 4B), which was observed that the single band in the unmodified pine sawdust was changed to double absorptive bands in all modified aggregators. The decrease in the intensity of the broad band around 3400 $cm^{-1}$, assigned to the cellulose O—H vibration, is additional evidence of the successful esterification of sawdust powders. The minimal intensity of O—H vibration peaks of mixed fatty acid-modified aggregators with C10 or C12 were observed.

Figure 5A:
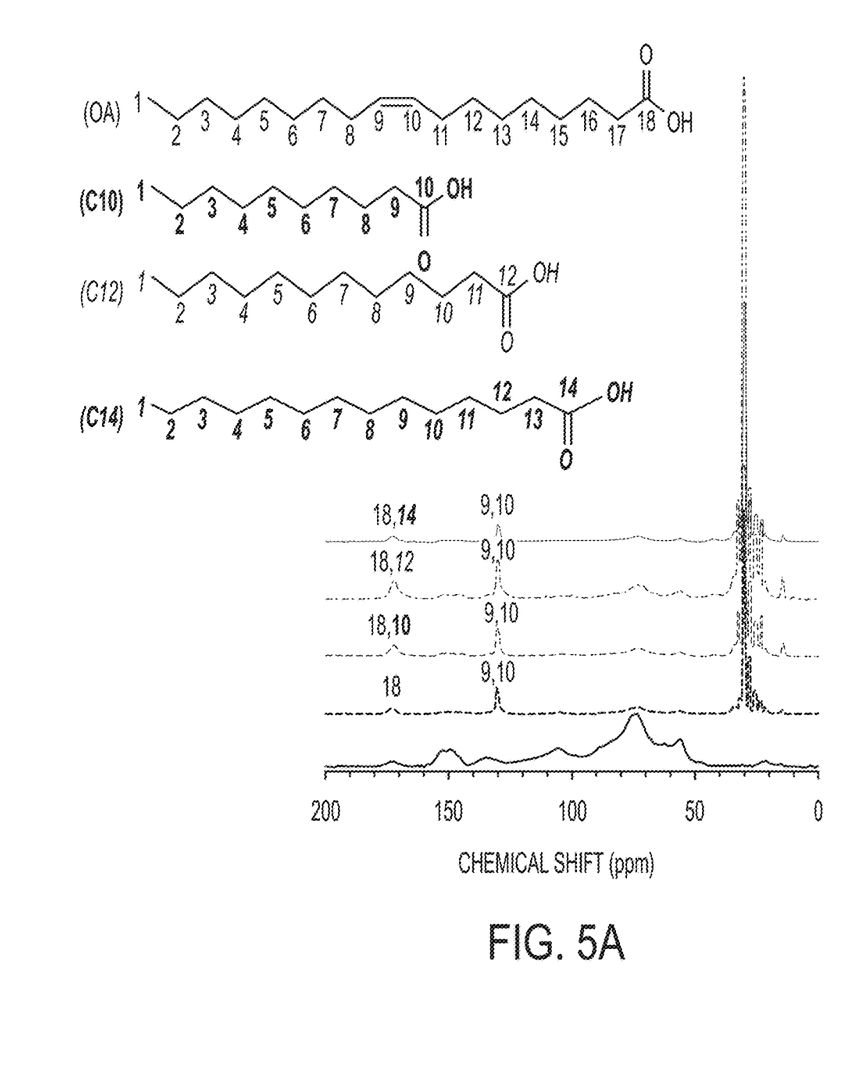
FIGS. 5A-5C include $^{13}C$ solid-state NMR spectra of unmodified pine, OA-modified pine, and mixed fatty acid-modified aggregators: (5A and 5B) pine/OA-106-based materials; (5C and 5D) pine/OA-124-based materials.
Figure 5B:
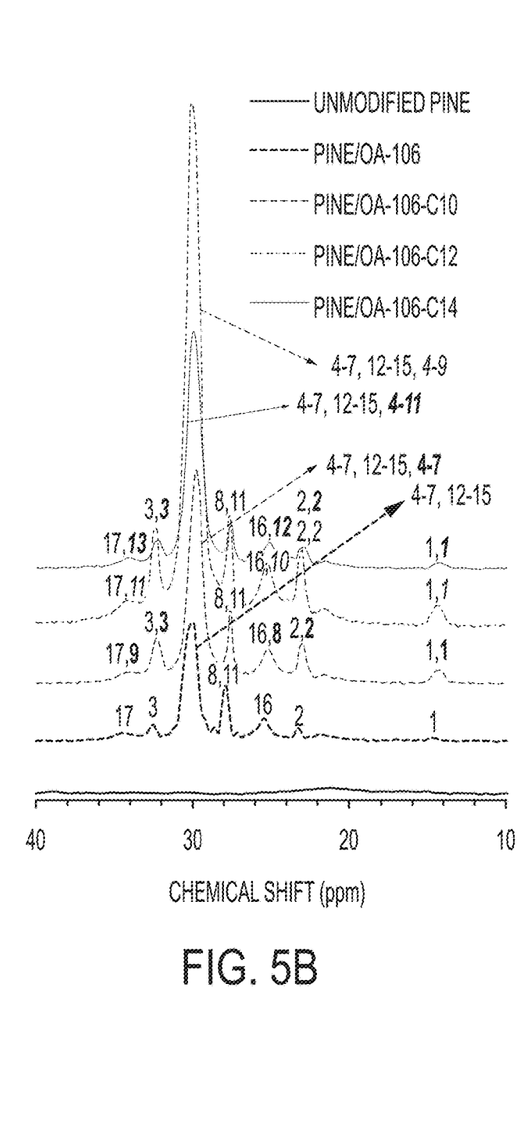
Figure 5C:
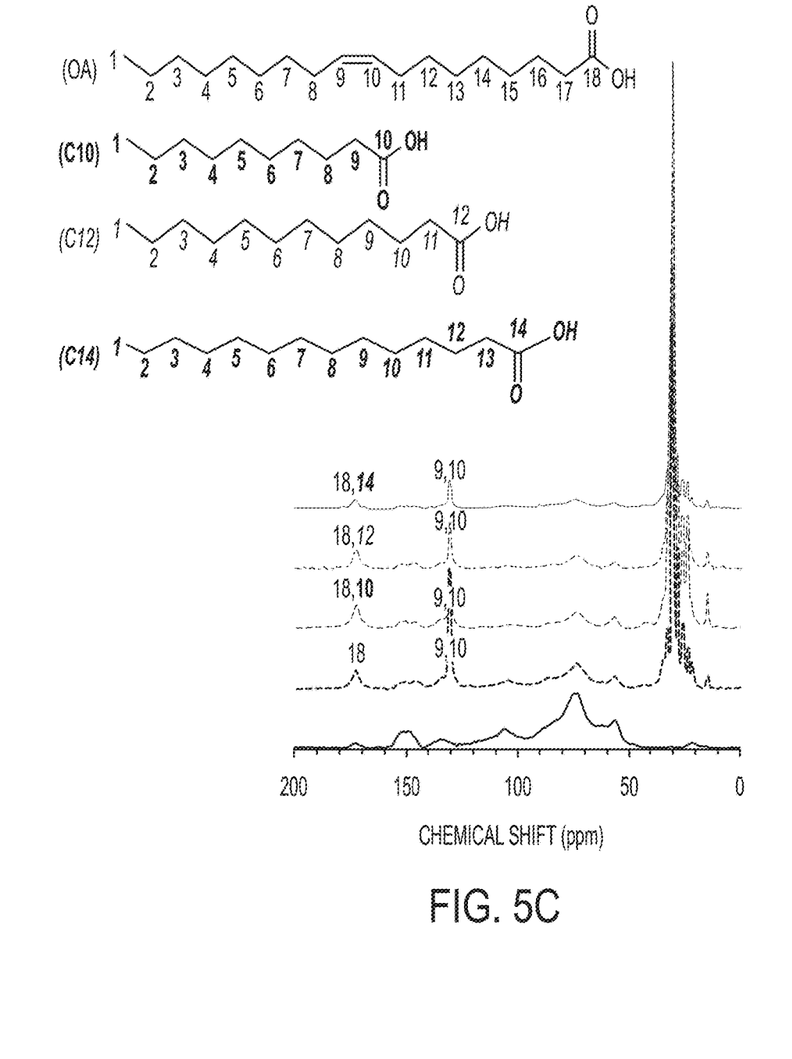
Figure 5D:
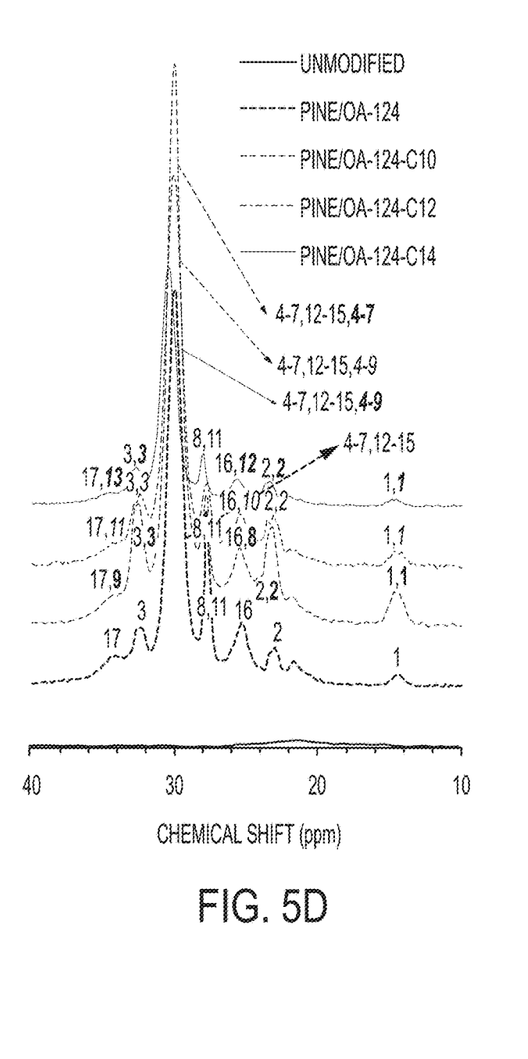
Figure 6A:
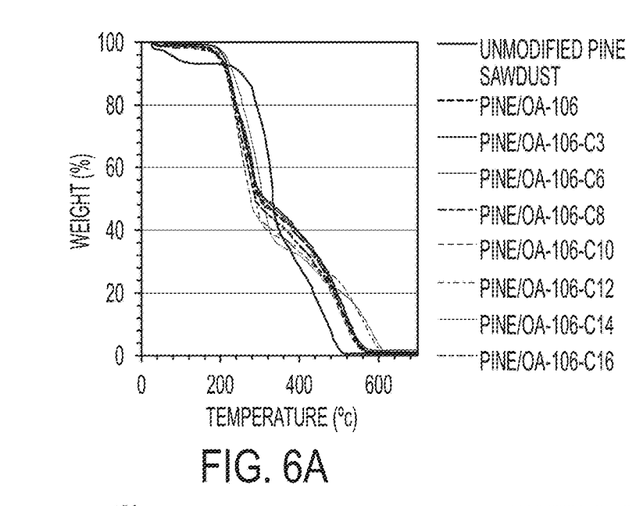
FIGS. 6A-6D include TGA and DTG plots of unmodified pine, OA-modified pine, and mixed fatty acid-modified aggregators: (6A and 6B) pine/OA-106-based materials and (6C and 6D) pine/OA-124-based materials.
Figure 6B:
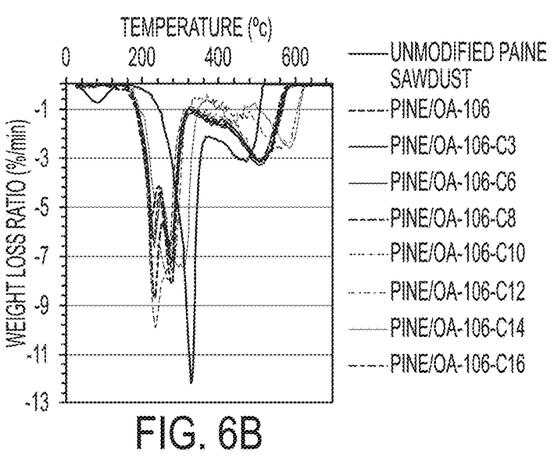
Figure 6C:
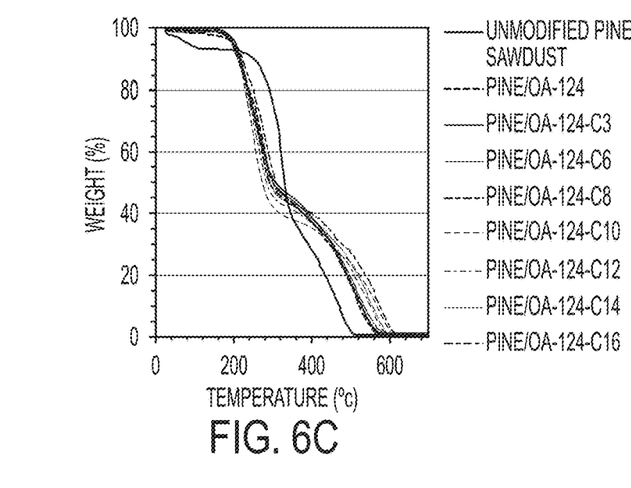
Figure 6D:
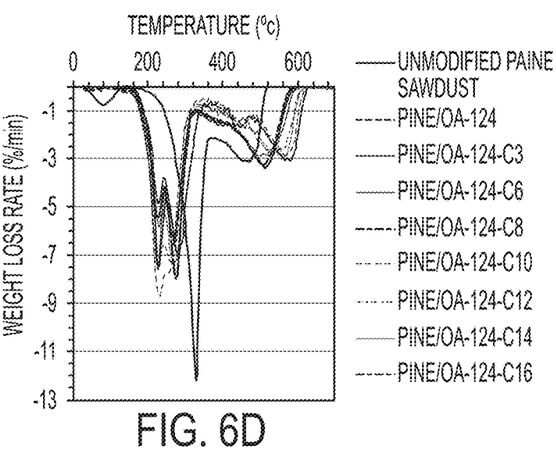
Figure 7A:
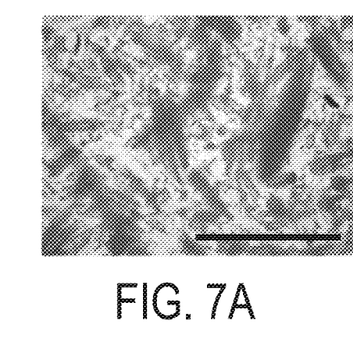
FIGS. 7A-7G are Optical microscopic images of (7A) untreated pine sawdust, (7B) pine/OA-106, (7C) pine/OA-106-C10, (7D) pine/OA-106-C12, (7E) pine/OA-124, (7F) pine/OA-124-C10, and (7G) pine/OA-124-C12. A scale bar in images indicates 500 μm.
Figure 7B:
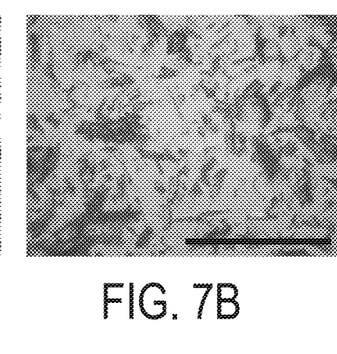
Figure 7C:
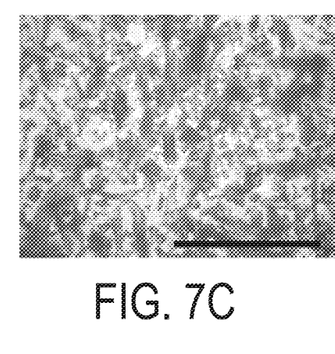
Figure 7D:
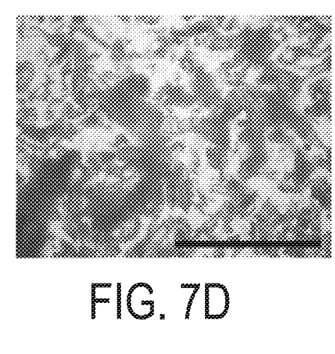
Figure 7E:
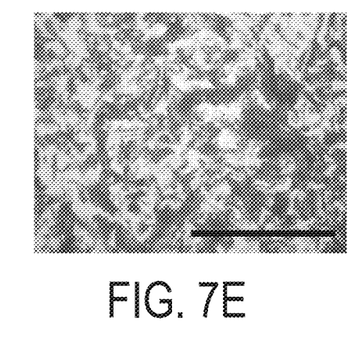
Figure 7F:
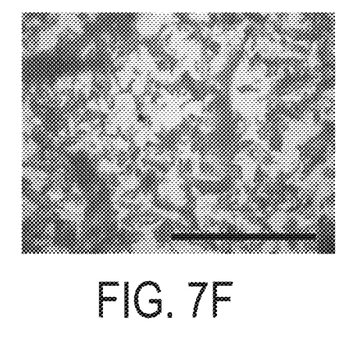
Figure 7G:
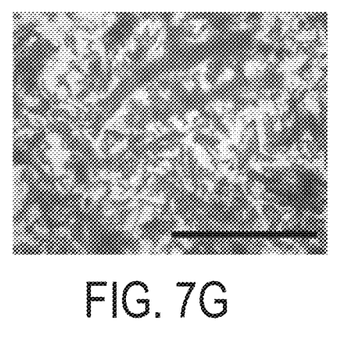

A $^{13}C$ CP/MAS NMR spectrum of unmodified sawdust is shown in FIG. 5A-5D. The peaks are not well-resolved due to the composite of cellulose, hemicellulose, and lignin. The resonance at 172.98 ppm indicates carbonyl groups in lignin. In the pine/OA samples, a new resonance at 129.5 ppm is associated with unsaturated carbons from OA modification. The peak shifting (to 171.95 ppm) and increasing intensity in the carbonyl region was observed with OA-modified and mixed fatty materials due to esterification with fatty acids. Appearance of new resonances in the spectra of modified aggregators, typical of aliphatic/alkyl groups (14-40 ppm), gave additional evidence of the occurrence of the esterification reaction. The total relative intensity of these peaks is well correlated to the WPG (FIG. 2A), as illustrated in FIGS. 5B and 5D. The direct comparison of relative area of crystalline and amorphous C4 (cellulose) peaks around 88 and 84 ppm for all spectra was not possible due to the modification of sawdust, not of pure cellulose fibers.

TABLE 2

TGA and DTG data for pine/OA-106-modified aggregators

| Aggregators | Weight loss at 150° C. (%) | T (° C.) at 50% weight loss | $Td_i$ (° C.) | $Td_1$ (° C.) | $Td_2$ (° C.) |
|---|---|---|---|---|---|
| pine sawdust | 6.45 | 332 | 208 | 328 | |
| pine/OA-106 | 1.66 | 299 | 168 | 225 (13.72) | 277 (26.35) |
| pine/OA-106-C3 | 1.47 | 310 | 167 | 229 (14.64) | 273 (21.15) |
| pine/OA-106-C6 | 1.49 | 308 | 171 | 229 (14.68) | 276 (22.78) |
| pine/OA-106-C8 | 0.99 | 290 | 168 | 233 (18.96) | 271 (21.94) |
| pine/OA-106-C10 | 0.68 | 275 | 161 | 234 (21.27) | 260 (20.00) |
| pine/OA-106-C12 | 0.53 | 286 | 168 | 232 (15.49) | 265 (20.27) |
| pine/OA-106-C14 | 0.59 | 307 | 169 | 236 (11.72) | 293 (28.80) |
| pine/OA-106-C16 | 1.39 | 303 | 169 | 228 (14.45) | 277 (23.93) |

TABLE 3

TGA and DTG data for pine/OA-124-modified aggregators

| Aggregators | Weight loss at 150° C. (%) | T (° C.) at 50% weight loss | $Td_i$ (° C.) | $Td_1$ (° C.) | $Td_2$ (° C.) |
|---|---|---|---|---|---|
| pine sawdust | 6.45 | 332 | 208 | 328 | |
| pine/OA-124 | 1.8 | 300 | 162 | 226 (14.35) | 275 (23.32) |
| pine/OA-124-C3 | 1.1 | 305 | 168 | 228 (16.45) | 272 (21.56) |
| pine/OA-124-C6 | 0.8 | 300 | 168 | 226 (16.29) | 275 (23.08) |
| pine/OA-124-C8 | 0.98 | 291 | 169 | 229 (17.37) | 271 (23.34) |
| pine/OA-124-C10 | 0.38 | 274 | 159 | 229 (19.42) | 254 (18.15) |
| pine/OA-124-C12 | 0.84 | 285 | 159 | 229 (16.61) | 262 (20.02) |
| pine/OA-124-C14 | 1.09 | 295 | 158 | 228 (14.21) | 270 (22.07) |
| pine/OA-124-C16 | 0.78 | 310 | 169 | 228 (11.55) | 280 (23.29) |

Thermal gravimetric (TG) measurements were performed to evaluate the thermal properties of mixed fatty acid-modified aggregators by comparing the temperatures of the first derivative of the weight loss curves. TGA and DTG (first differential TG) curves of the samples are shown in FIGS. 6A-6D. The data of weight loss at 150° C., initial decomposition temperature $Td_i$, and decomposition temperature at maximum degradation rates, $Td_1$ and $Td_2$ for two sets of mixed fatty acid-modified aggregators are shown Tables 2 and 3. The unmodified pine sawdust shows a single weight-loss step with a maximum at about 328° C., where the decomposition of hemicellulose and cellulose was not separated in a 10° C./min heating rate. The broad peak between 350 and 550° C. in DTG of unmodified sawdust is attributed to the decomposition of lignin. It was observed that mixed fatty acid-modified aggregators showed very similar thermal stability to those of OA-modified base materials due to their similar molecular structures, where the modification of sawdust with mixed fatty acids dramatically changed the thermal stability. Mixed fatty acid-modified aggregators started to decompose at temperatures (~160° C.), which were substantially lower than unmodified sawdust (>208° C.), and mixed fatty acid-modified aggregators with C10-C14 showed the lowest thermal stability, as seen from changes in $Td_i$ in Table 2 and 3. This behavior is attributed to the further decrease in crystallinity associated with substitution of cellulose hydroxyls with mixed fatty acids. The thermograms of mixed fatty acid-modified aggregators showed two main separate degradation steps, with maximum degradation temperatures around 220° C. ($Td_1$) and 270° C. ($Td_2$), where $Td_1$ was assigned to the cellulose fraction of the aggregators and $Td_2$ was attributed to the fatty acid fraction. It was also observed that the weight loss at initial test temperature (150° C.) decreased with the second fatty acid-substitution. This is attributed to less moisture content for the samples with the second fatty acid-substitution. The second C10 and C12 substitution of pine/OA-106 and pine/OA-124 showed the least moisture content, which is consistent with the moisture sorption data discussed earlier.

Optical microscope images have been taken to investigate morphological changes of mixed fatty acid-modified aggregators after the second-modification of OA-modified base materials. FIGS. 7A-7G shows the surface of unmodified, OA-modified, and mixed fatty acid-modified materials. It was observed that the main structure was maintained, but the diameter of separated OA-modified and mixed fatty acid-modified cellulose fibers looked more separated and a slight increase due to the exfoliated reaction and surface coating with fatty acids.

Figure 8:
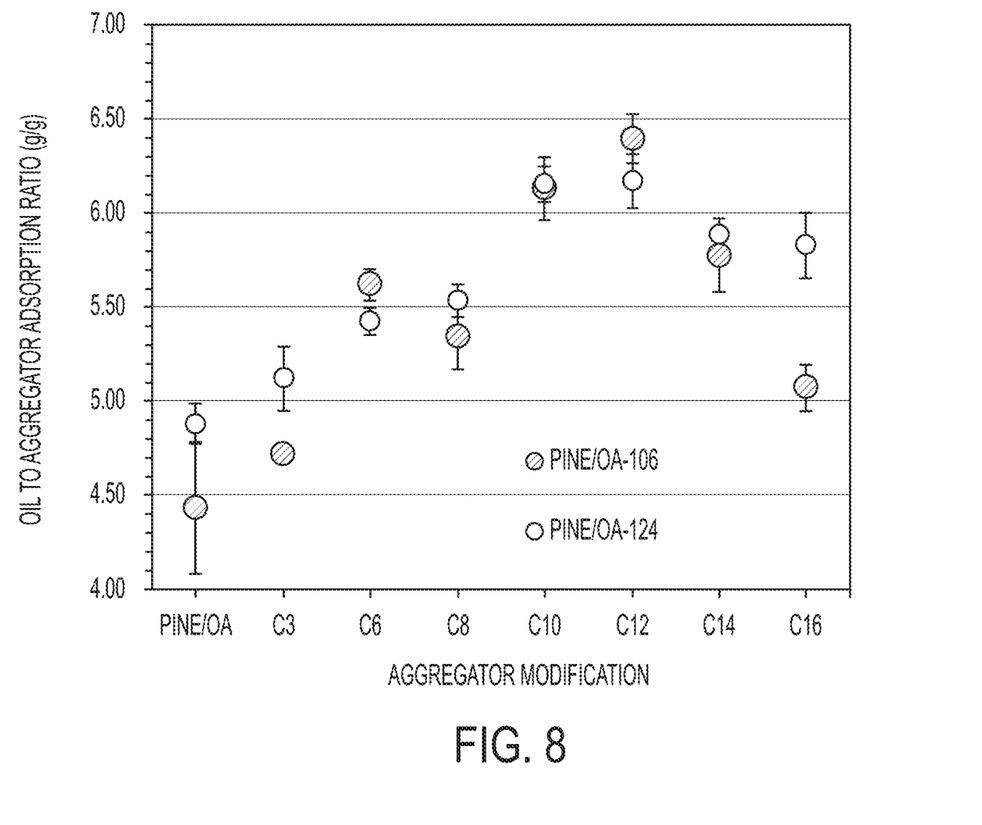
FIG. 8 is a graph of a crude oil sorption plot for mixed fatty acid-modified sawdust aggregators based on Pine/OA-106 and pine/OA-124.

FIG. 8 shows sorption capacity of mixed fatty acid-modified aggregators including OA-modified base materials. A modified sorption technique has been used to measure maximum crude oil sorption capacity because it is not easy to collect crude oil sorbed aggregators in sea water. Unmodified pine sawdust showed high capacity of about 4.0 g crude oil per g pine. However, it showed minimal retention of buoyancy in waving sea water. Oil sorption capacity of aggregators was proportional to alkyl chain length of mixed fatty acid and showed maximum sorption capacities when the base aggregators were further modified with C12. The maximum capacity, 6.42 g/g, is a 45.6% enhanced capacity relative to that of the base aggregator (pine/OA-106). Aggregators modified with longer alkyl chains (C14 and C16) showed decreased capacities. This crude oil sorption pattern is very consistent with moisture sorption, XRD, FT-IR, TGA data. When the best aggregator, pine/OA-106-C12 was recycled (crude oil removed by washing with dichloromethane and subsequently dried), the aggregator showed consistent sorption toward crude oil with 1.3-2.4% deviation.

Burn tests demonstrated that the aggregator allowed thin slicks of oil (<1 mm) to be ignited. Additionally, the aggregator allowed for more rapid ignition and complete burning of oil in the presence of sea ice. Ash and tar resulting from oil burned with the aggregator remained buoyant in seawater for greater than 2 weeks. At freezing temperatures and with natural turbulence, oil can become mixed into a layer of frazil or grease ice; however, aggregator applied onto the surface of the water captures and retains oil when it rises to the surface, eventually separating the oil from the ice, In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A method comprising:
modifying a native surface of a cellulosic particle with oleic acid to yield a first modified surface comprising C17 alkyl chains; and
modifying the first modified surface with a fatty acid having a second alkyl chain length different than C17 to yield a hydrophobic second modified surface comprising C17 alkyl chains and alkyl chains having the second alkyl chain length.

2. The method of claim 1, wherein the cellulosic particle comprises a wood particle.

3. The method of claim 2, wherein the wood particle comprises a soft wood particle.

4. The method of claim 1, wherein the second alkyl chain length is less than or equal to C22.

5. The method of claim 1, wherein the second alkyl chain length is between C10 and C14, inclusive.

6. The method of claim 1, wherein said modifying comprises adding the cellulosic particle to a solution comprising pyridine with oleic acid, the fatty acid, or both dissolved therein.

7. The method of claim 6, wherein the solution further comprises p-toluenesulfonyl dissolved therein.

8. The method of claim 1, further comprising modifying the second modified surface with a fatty acid having a third alkyl chain length different than C17 and the second alkyl chain length to yield a hydrophobic, third modified surface comprising C17 alkyl chains and alkyl chains having the second and third alkyl chain lengths.

9. The method of claim 1 further comprising depositing a bioremediation microorganism on the hydrophobic second modified surface.

10. The method of claim 1 further comprising incorporating the cellulosic particle having the hydrophobic second modified surface into a composite construction material comprising a polymer.

11. A hydrocarbon-remediation aggregator comprising a water-buoyant, wood particle having a hydrophobic surface that comprises C17 alkyl chains and at least one other type of alkyl chain having a chain length different than C17, and wherein the aggregator has a crystallinity index less than or equal to 3% and a hydrocarbon sorption capacity of at least 5 g of hydrocarbon per gram of aggregator.

12. The hydrocarbon-remediation aggregator of claim 11, wherein the hydrophobic surface further comprises a bioremediation microorganism attached thereto.

13. A method of environmental remediation comprising:
dispersing a quantity of particulate aggregators at a surface region of an aqueous environment in which a liquid hydrocarbon has been spilled, wherein the solid aggregators comprises water-buoyant, cellulosic particles having a hydrophobic surface modified by oleic acid and further modified by one or more additional fatty acids, the hydrophobic surface comprising C17 alkyl chains and at least one other type of alkyl chain having a chain length different than C17;
adsorbing the liquid hydrocarbon to the solid aggregators;
aggregating a floating mass at the surface of the aqueous environment, the mass comprising the solid aggregator having the liquid hydrocarbon adsorbed thereto;
collecting the mass comprising aggregator and liquid hydrocarbon from the surface of the aqueous environment; and
burning the mass in-situ at the surface of the aqueous environment.

14. The method of claim 13, wherein the fatty acid has an alkyl chain length less than C22.

15. The method of claim 13, wherein the fatty acid has an alkyl chain length between C10 and C14, inclusive.

16. The method of claim 13, wherein said adsorbing does not include chemically reacting with water in the aqueous environment.

17. The method of claim 1, wherein the solid aggregator has an oil sorption capacity of at least 5 g of hydrocarbon per gram of aggregator.

18. A method of environmental remediation comprising:
dispersing a quantity of particulate aggregators at a surface region of an aqueous environment in which a liquid hydrocarbon has been spilled, wherein the solid aggregators comprises water-buoyant, cellulosic particles having a hydrophobic surface modified by oleic acid and further modified by one or more additional fatty acids, the hydrophobic surface comprising C17 alkyl chains and at least one other type of alkyl chain having a chain length different than C17;
adsorbing the liquid hydrocarbon to the solid aggregators;
aggregating a floating mass at the surface of the aqueous environment, the mass comprising the solid aggregator having the liquid hydrocarbon adsorbed thereto;
collecting the mass comprising aggregator and liquid hydrocarbon from the surface of the aqueous environment; and
remediating in situ the liquid hydrocarbon adsorbed to the solid aggregator, wherein the hydrophobic surface of the solid aggregator further comprises a bioremediation microorganism.

19. The method of claim 18, wherein the fatty acid has an alkyl chain length less than C22.

20. The method of claim 18, wherein the fatty acid has an alkyl chain length between C10 and C14, inclusive.

21. The method of claim 18, wherein the solid aggregator has an oil sorption capacity of at least 5 g of hydrocarbon per gram of aggregator.

22. The method of claim 18, wherein said adsorbing does not include chemically reacting with water in the aqueous environment.

* * * * *